June 30, 1970    O. LUTHI    3,517,818

ROTARY DRUM FILTER

Filed March 7, 1969

United States Patent Office 3,517,818
Patented June 30, 1970

3,517,818
ROTARY DRUM FILTER
Oscar Luthi, Nashua, N.H., assignor to Improved Machinery Inc., Nashua, N.H., a corporation of Delaware
Filed Mar. 7, 1969, Ser. No. 805,136
Int. Cl. B01d 35/12
U.S. Cl. 210—392                                14 Claims

ABSTRACT OF THE DISCLOSURE

A rotary drum filter having a rotary filter cycle including an arcuate portion during which subatmospheric pressure is applied to filtrate compartments, located around the periphery of the filter drum, for drying stock and also an arcuate portion during which the subatmospheric pressure is cut off from such compartments. The filter is provided with means for adjusting the communication between the compartments and the means applying the subatmospheric pressure whereby such communication can be varied to control the air flow from the compartments to the subatmospheric pressure applying means during the first mentioned portion of the filter cycle.

BACKGROUND OF THE INVENTION

The present invention relates to filtering apparatus and more particularly to rotary drum filters of the type for filtering a slurry such as, for example, pulp stock for the manufacture of paper.

Conventionally, rotary drum filters of this type frequently comprise a generally cylindrical, rotatably driven drum provided with a circumferential filter screen and having generally longitudinally extending filtrate compartments inwardly of the filter screen. During the operation of such a filter, a subatmospheric pressure or vacuum is applied to each of the filtrate compartments during a portion of the filter cycle for drying the collected stock; and the subatmospheric pressure or vacuum is cut off from the compartments during another portion of the cycle for removal of filtered stock or filter cake from the screen. The subatmospheric pressure is generally created by a single barometric leg; and the subatmospheric pressure is cut off from the compartments by a nonrotatable valving assembly which may be located adjacent an end of the drum, but which preferably is of the type described in United States Pats. No. 3,327,862 and 3,327,863 and located generally centrally of the drum.

This type of filter, although generally satisfactory in operation, is of course subject to the disadvantage that the barometric leg can only successfully handle a limited quantity of air; and, hence, excessive air flow through the filtrate compartments into the barometric leg can seriously impair the operation of the filter. Moreover, the application of the subatmospheric pressure to the compartments for drying the collected stock inherently draws air through the stock into the compartments from whence it is discharged with the filtrate to the barometric leg. This flow of air through the stock in conventional filters employed with a freer stock may be sufficiently great to seriously affect the operation of the barometric leg and, resultantly, seriously adversely affect the operating performance of the filter.

SUMMARY OF THE INVENTION

An object of the present invention is to provide a new and improved rotary drum filter which is particularly constructed and arranged to permit adjustment of the communication between the filtrate compartments and a subatmospheric pressure applying apparatus such as a barometric leg.

Another object of the invention is to provide a new and improved rotary drum filter which is particularly constructed and arranged to permit adjustment of the communication of the compartments with the subatmospheric pressure applying apparatus during said portion of the filter cycle in which subatmospheric pressure is applied for drying the stock, whereby the beforementioned air flow at such time may be minimized substantially regardless of the freeness of the stock to be filtered.

These objects, and those other objects and advantages of the invention which will be apparent from the following description taken in connection with the accompanying drawings, are in general attained by the provision of a rotary drum filter comprising a rotatable drum having peripheral filtrate compartments which extend generally longitudinally of the drum and co-operate to form an annular volume peripherally therearound, such filter having a rotary filter cycle including one arcuate portion during which subatmospheric pressure is applied to the compartments and another arcuate portion during which the subatmospheric pressure is cut off from the compartments, and such filter also including means for cutting off the subatmospheric pressure from the compartments during said another arcuate portion of the filter cycle, and means for adjusting the communication of the compartments with the means applying the subatmospheric pressure during said one arcuate portion of the filter cycle.

BRIEF DESCRIPTION OF THE DRAWINGS

Referring to the drawings.

DESCRIPTION OF THE PREFERRED EMBODIMENT

Figure 1:
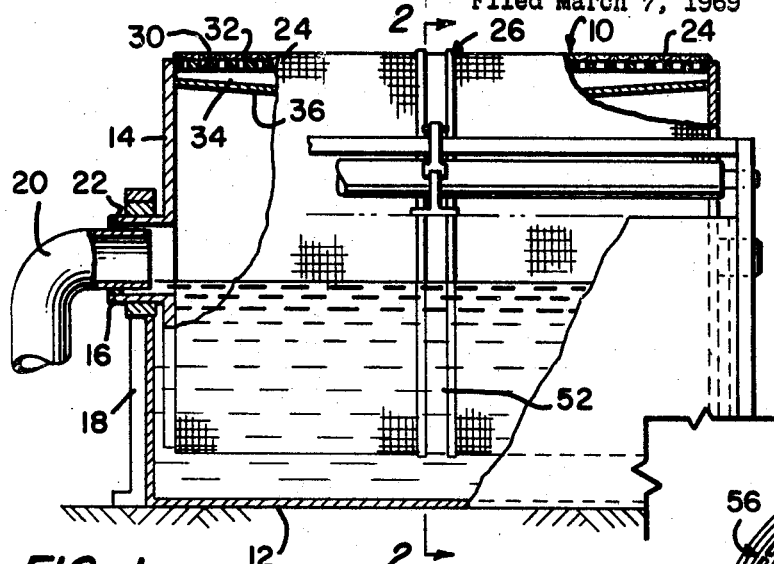
FIG. 1 is an elevational side view, partially broken away and in section, of a rotary drum filter constructed in accordance with the present invention.

Referring more particularly to the drawings wherein similar reference characters designate corresponding parts throughout the several views, the illustrated rotary drum filter generally considered is of the type described in the aforementioned United States Pat. No. 3,327,863. The drum filter comprises a rotatably driven drum designated generally as 10 which is partially submerged in a tank or vat 12 containing a slurry including pulp fibers. The drum 10 is constructed to include a pair of end closure plates 14 each having mounted thereon a trunnion 16 serving to rotatably support the drum 10 on a bearing support 18. One of the trunnions 16 is hollow and has the upper end of a conventional barometric leg or vacuum pipe 20 extending thereinto. A suitable annular seal 22 is located intermediate the inner circumference of such trunnion 16 and the outer circumference of the barometric leg 20 to seal the space therebetween while permitting rotation of the drum 10 relative to the barometric leg 20. The barometric leg 20 during the operation of the drum filter operates in the conventional manner to drain filtrate from internally of the drum 10 and creates and applies a subatmospheric pressure or vaccum internally of the drum 10.

The drum 10 is constructed to include two axially spaced aligned cylindrical drum sections 24, each located adjacent one end of the drum 10, spaced one from the other by an annular channel or space designated generally as 26 which is adjacent the longitudinal midpoint of the drum 10. The drum sections 24 are connected by suitable internal conventional bracing elements 28 to be conjointly rotatable and each are peripherally provided with an annular winding wire 30 having an annular filter screen 32 peripherally therearound. The drum sections 24 each contain a plurality or series of generally longitudinally extending filtrate compartments 34 along their periphery. The filtrate compartments 34 are each bounded along their inner bottom by a bottom wall or floor 36, along their outer top by a winding wire 30, and on their opposing sides by circumferentially spaced side walls or ribs 38 extending generally longitudinally of the drum 10. The filtrate compartments 34 are arranged around the entire periphery of each of the drum sections 24; and the compartments 34 of each drum section 24 cooperate to form an annular volume peripherally around the latter throughout the length thereof. The filtrate compartments 34 for each drum section 24 have open ends 40 communicating with the annular space 26 and (except as prevented in the manner hereinafter described) communicate through the annular space 26 with the surrounded interior chamber of the drum 10 whereby the subatmospheric pressure applied internally of the drum 10 is applied to the filtrate compartments 34 through the space 26 and open ends 40 and filtrate is drained from the compartments 34 through the space 26 and open ends 40. The open ends 40 of the filtrate compartments 34 of each of the drum sections 24 are arranged generally side-by-side to form an annular band of the open ends 40 peripherally around the drum 10 adjacent each side of the space 26, and hence such bands of open ends 40 are in opposed spaced relationship. The open ends 40 form the sole communication between the compartments 34 of each drum section 24 with the interior chamber of the drum 10; and the bottom walls 36 of the compartments 34 of each drum section 24 are preferably formed by a single annular element arranged to slope downwardly towards the open ends 40 for facilitating drainage therethrough.

Figure 2:
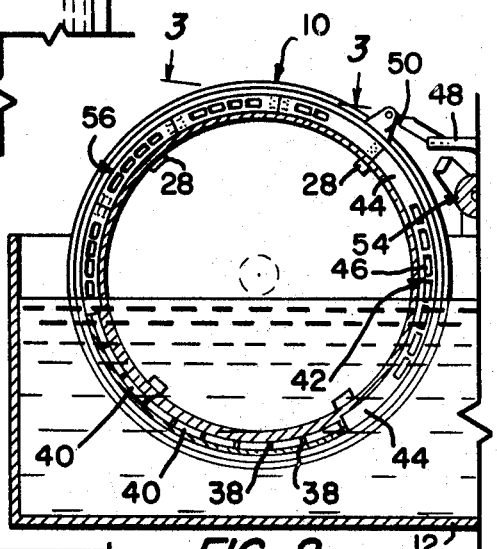
FIG. 2 is an elevational sectional view of the filter taken on line 2—2 of FIG. 1, looking in the direction of the direction of the arrows.

In the operation of the drum filter, the drum 10 is rotatably driven in the clockwise direction, as viewed in FIG. 2, to move the compartments 34 successively below the level of the slurry in the vat 12 for collection of stock on the overlying screen 32 and then above the slurry level for drying and removal of the collected stock. The subatmospheric pressure is cut off from each of the compartments 34 during the initial submergence thereof into the slurry and also during the removal of the collected filtered stock (i.e. throughout approximately the 2 o'clock through 5 o'clock portion of the rotary filter cycle) by a stationary or nonrotatable valving assembly designated generally as 42. The illustrated valving assembly 42 is of the type described in U.S. Pat. No. 3,327,863 and, as shown in FIG. 2, is positioned in the annular space 26 to arcuately extend from approximately the 2 o'clock position through substantially the 5 o'clock position.

The valving assembly 42, more particularly, comprises a pair of nonrotatable or stationary, spaced side sealing walls 44 which each extend the entire arcuate length of the valving assembly 42 and each throughout their lengths slidably sealingly engage the drum 10 along one of the bands of open ends 40 to prevent communication of the latter with the interior chamber of the drum 10 through the annular space 26. The side sealing walls 44 are interconnected at their opposing ends by end closure walls and along their inner and outer peripheries by top and bottom closure walls such that the valving assembly 42 contains a valve chamber or cavity sealed from the interior of the drum 10. Openings 46 are, in the conventional manner, formed through the thickness of the walls 44 for permitting air flow through the valve chamber from initially submerging compartments 34 to compartments 34 not yet submerged. The illustrated valving assembly 42 is held nonrotatable or stationary by a connecting or keying plate 50, mounted on a fixedly mounted bracket 48, which plate 50 in the conventional manner extends through an annular channel or space formed between annular cover plates 53 carried by the drum sections 24. Alternatively, however, the valving assembly 42 could be so held by other suitable conventional arrangements such as, for example, by means internally of the drum 10.

An annular sealing band 52 is carried by the drum 10 circumferentially around the annular space 26 to prevent leakage through the annular channel between the cover plates 53. The take-off means or doctor 54 is arranged to remove filtered stock from the screen 32 opposite the upper or (as viewed in FIG. 2) counterclockwise end of the valving assembly 42 such that, as aforementioned, the latter prevents subatmospheric pressure from being applied to the compartments 34 during removal of the overlying stock. The doctor 54 may, of course, be of any desired conventional construction.

In accordance with the present invention the filter is provided with means for adjusting the communication of the open ends 40 of the compartments 34 with the subatmospheric pressure applying means or barometric leg 20 during the arcuate drying portion of the rotary filter cycle. More particularly, as illustrated in FIG. 2, this means comprises an arcuate assembly designated generally as 56 which is positioned in the annular space 26 arcuately end-to-end with the uppermost or counterclockwise end of the valving assembly 42. The assembly 56, as illustrated in FIG. 2, is preferably constructed of suitable arcuate length to extend from such counterclockwise end of the valving assembly 42 throughout the entire drying portion of the filter cycle and preferably has its counterclockwise end slightly below the level of the slurry in the vat 12. The assembly 56 is connected to the valving assembly 42 to in effect form an arcuate extension of the latter and cause the assemblies 42, 56 to both be held nonrotatable or stationary by the same bracket 48 and connecting plate 50.

The assembly 56 is constructed from a plurality of arcuate box-like sections 58 which are arranged arcuately end-to-end and detachably interconnected by linkage means designated generally as 60. The sections 58 in the illustrated embodiment of the invention are four in number, but have been so shown only for the purposes of illustration; and alternatively the sections 58 could be of other suitable number. Moreover, although as aforementioned the assembly 56 normally preferably extends throughout the entire drying portion of the filter cycle as such length provides its maximum effectiveness, it could if desired be of shorter arcuate length and extend for only a part of the drying portion of the filter cycle.

Figure 4:
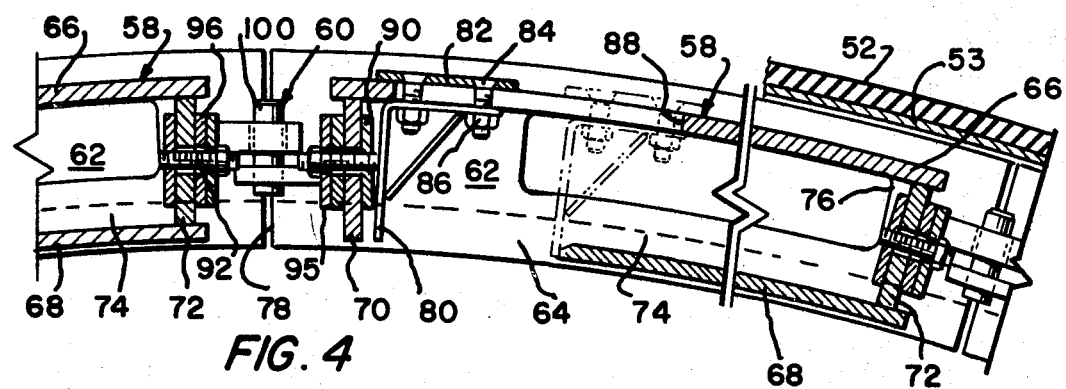
FIG. 4 is a fragmentary, elevational sectional view taken on line 4—4 of FIG. 3, looking in the direction of the arrows.

Each section 58 of the assembly 56, as illustrated in FIG. 4 wherein one thereof has been shown enlarged for the purposes of example, essentially comprises a plurality of walls enclosing a chamber 62 which communicates with open ends 40 of both bands and also communicates through a flow passage or opening 64 with the interior of the drum 10, and means for providing adjustable throttling of flow through the flow passage 64. More particularly, each section 58 comprises an arcuate top or outer wall 66 bounding the top of the chamber 62, an arcuate bottom or inner wall 68 which bounds the bottom of the chamber 62 and has the flow passage 64 therethrough, and a pair of end walls 70, 72 closing the opposing ends of the chamber 62. Each section 58, in addition, includes a pair of arcuate side walls 74 which are rigidly connected to the opposing sides of the walls 66, 68, 70, 72 to together therewith form a unitary construction, such side walls 74 each slidably engaging one of the drum sections 24 along its band of open ends 40 throughout the length of the section 58 to prevent communication of the open ends 40 with the interior of the drum 10 therearound. The side walls 74 each include an arcuate opening 76 therethrough for communicating the open ends 40 with the chamber 62, such openings 76 being of sufficient arcuate length that each chamber 62 communicates simultaneously with a plurality of the open ends 40 of each band. The openings 76 in the most clockwise section 58, as will be noted from FIG. 2, are particularly arranged to prevent the open ends 40 from communicating with the chamber 62 of such section 58 at the end thereof nearest to the location at which stock is removed from the screen 32 by the doctor 54. The side walls 74 are formed of arcuate lengths suitable to cause corresponding side walls 74 of adjacent sections 58 to be spaced only by an extremely narrow clearance or gap 78; and hence the chambers 62 of the sections 58 form substantially the sole communication between the open ends 40 and the barometric leg 20 throughout the length of the assembly 56.

Figure 3:
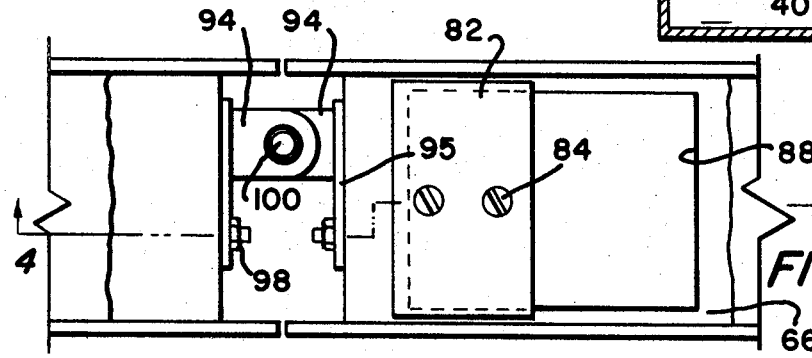
FIG. 3 is an enlarged fragmentary view taken on line 3—3 of FIG. 2, looking in the direction of the arrows.

Each section 58, as beforementioned, is provided with a means for adjustably throttling fluid flow through its flow passage 64; and such means are individually adjustable to permit different adjustments to be maintained for different sections 58. The throttling means for each section 58 comprises a throttling or valving element 80 adjustable to a fully open position shown solid in FIG. 4, a fully throttling or fully closed position shown in broken lines in FIG. 4, and a practically infinite number of partially throttling or partially closed positions therebetween. Each throttling element 80 is mounted on a mounting plate 82, slidably supported on the outer or upper surface of the upper wall 66 of the respective section 58, to which it is connected by a plurality of threaded retainers 84 extending through an adjustment opening 88 in such upper wall 66 and each provided with a nut 86 affixed to the throttling element 80. As will be understood, the portion or portions of the adjustment opening 88 not closed by the mounting plate 82 are during the operation of the filter closed by the overlying cover plates 53, such cover plates 53 and the sealing band 52 being broken away in FIGS. 3 and 4 to ensure clarity in the illustration of the shown section 58.

Individual and practically infinite adjustment of a throttling element 80 is accomplished without any necessity for dismantling the drum 10, but rather requires merely that the sealing band 52 be moved to permit access to the threaded retainers 84 for the throttling element 80 through the annular channel between the cover plates 53. Then such threaded retainers 84 are loosened sufficiently to permit the mounting plate 82 for the element 80 to be slid along the upper surface of the outer wall 66, the mounting plate 82 is manually slid to a position wherein the carried element 80 provides the desired throttling effect, and the threaded retainers 84 are retightened to lock the mounting plate 82 and throttling element 80 in their adjusted positions. The other throttling elements 80 are, if desired, also so adjusted; and the sealing band 52 is repositioned whereupon the filter is again ready for operation.

The linkage means 60 detachably connecting adjacent ones of the sections 58 each comprise plates 90 mounted to the adjacent end walls 70, 72 of such sections 58 and threaded retainers 92 which are rigidly connected, such as by welding, to the plates 90. The retainers 92 each carry a mounting plate 95 which is spaced from the adjacent end wall 70, 72 by a shim 96 and locked against movement axially of the retainer 92 by a nut 98. The mounting plates 95 rigidly carry connectors 94 having aligned openings therethrough receiving a single pin 100. Hence, by removal of one of the pins 100 one or more sections 58 may be readily and simply detched from the assembly 56.

From the preceding description it will be seen that the throttling elements 80 are readily and simply adjustable to vary the communication of the compartments 34 with the barometric leg 20 during the drying portion of the filter cycle. It will also be seen that, by adjustment of the elements 80 to positions commensurate with the stock to be filtered, air flow from the compartments 34 to the barometric leg 20 during such drying portion may be minimized for stock of substantially any freeness. Hence, from the preceding description it will be seen that I have provided new and improved means for accomplishing all of the objects and advantages of my invention. It will be understood, however, that, although I have illustrated and hereinbefore specifically described only a single embodiment of my invention, my invention is not limited merely to this single embodiment but rather contemplates other embodiments and variations.

Having thus described my invention, I claim:

1. A rotary drum filter comprising a rotatable drum having peripheral filtrate compartments which extend generally longitudinally of said drum and co-operate to form an annular volume peripherally around a surrounded interior chamber within said drum, said filter having a rotary filter cycle including one arcuate portion during which subatmospheric pressure is applied to said compartments through such drum interior chamber and another arcuate portion during which the subatmospheric pressure is cut off from said compartments, means for cutting off the subatmospheric pressure from said compartments during said another arcuate portion of the filter cycle, and means intermediate said compartments and the drum interior chamber for adjustably varying the communication of said compartments with the means applying the subatmospheric pressure during said one arcuate portion of the filter cycle.

2. A rotary drum filter according to claim 1, wherein said communication adjusting means is arranged to adjust the communication between said compartments and the means applying the subatmospheric pressure during the arcuate portion of the filter cycle substantially immediately preceding said another arcuate portion thereof.

3. A rotary drum filter according to claim 1, wherein said communication adjusting means is constructed to cause the communication between said compartments and the means applying the subatmospheric pressure to be separately adjustable for each of a plurality of arcuate segments of said one arcuate portion.

4. A rotary drum filter according to claim 1, further comprising a container containing a slurry to be filtered, said drum being partially submerged in the slurry in said container, and said communication adjusting means being arranged for adjusting the communication of compartments above the level of the slurry with the means applying the subatmospheric pressure.

5. A rotary drum filter comprising a rotatable drum having peripheral filtrate compartments which extend generally longitudinally of said drum and co-operate to form an annular volume peripherally around a surrounded interior chamber within said drum, said filter having a rotary filter cycle including one arcuate portion during which subatmospheric pressure is applied to said compartments through the drum interior chamber and another arcuate portion during which the subatmospheric pressure is cut off from said compartments, said compartments having open ends through which the subatmospheric pressure is applied to said compartments and through which filtrate is drained from said compartments, said open ends being arranged to form a band of the open ends peripherally around said drum, means adjacent said band of open ends and held against rotation for cutting off the subatmospheric pressure from said compartments during said another arcuate portion of the filter cycle, and wall means held against rotation and bounding a chamber communicating with said open ends during said one arcuate portion of the filter cycle, said chamber being provided with a flow passage communicating said chamber through the drum interior chamber with the subatmospheric pressure applying means whereby subatmospheric pressure is applied to said open ends through said chamber, and means for adjustably varying flow through said flow passage.

6. A rotary drum filter according to claim 5, wherein said chamber is arranged to extend arcuately along said open ends.

7. A rotary drum filter having a rotary filter cycle including one arcuate portion during which subatmospheric pressure is applied for drying stock and another arcuate portion during which the subatmospheric pressure is cut off, said filter comprising a rotatable drum, means for applying the subatmospheric pressure internally of said drum, a plurality of peripheral filtrate compartments which extend generally longitudinally of said drum and co-operate to form an annular volume peripherally around said drum, said compartments having open ends through which the subatmospheric pressure is applied to said compartments and through which filtrate is drained from said compartments, such open ends being arranged to form a band of the open ends peripherally around said drum, means held against rotation and extending arcuately along said band of open ends for preventing communication of said compartments with said subatmospheric pressure applying means during said another arcuate portion of the filter cycle, and wall means held against rotation and defining a plurality of chambers arranged end-to-end arcuately along said open ends, said chambers communicating with said open ends during said one arcuate portion of the filter cycle, said chambers also communicating with the interior of said drum through flow passages whereby the subatmospheric pressure is applied to said open ends through said chambers during said one arcuate portion of the filter cycle, and means for adjustably varying flow through said flow passages.

8. A rotary drum filter according to claim 7, wherein said chambers separately communicate with said open ends and are individually provided with flow passages, said flow varying means being operable to independently vary flow through each of said flow passages.

9. A rotary drum filter according to claim 7, wherein each of said chambers simultaneously communicates with a plurality of said open ends.

10. A rotary drum filter having a rotary filter cycle including one arcuate portion during which subatmospheric pressure is applied for drying of stock and another arcuate portion during which the subatmospheric pressure is cut off, said filter comprising a rotatable drum, means for applying subatmospheric pressure internally of said drum, said drum having a pair of axially spaced series of peripheral filtrate compartments which extend generally longitudinally of said drum and form annular volumes peripherally around said drum, said compartments having open ends located intermediate the ends of said drum through which the subatmospheric pressure is applied to said compartments and through which filtrate is drained through said compartments, the open ends of the compartments of each series being arranged to form a band of open ends peripherally around said drum and said bands of open ends being arranged in opposed spaced relationship, means held against rotation and extending arcuately between said bands of open ends for cutting off the subatmospheric pressure from said compartments during said another portion of the filter cycle, and wall means held against rotation defining a chamber which is intermediate said bands of open ends and which communicates with open ends of each band during said one arcuate portion of the filter cycle, such chamber also communicating through a flow passage with the interior of said drum whereby the subatmospheric pressure is applied to said open ends through said chamber during said one arcuate portion of the filter cycle, and means adjustable for varying the flow through said flow passage.

11. A rotary drum filter according to claim 10, wherein said adjustable means is accessible externally of the drum to permit its adjustment without dismantling the drum.

12. A rotary drum filter according to claim 10, wherein said wall means also defines a second chamber which is intermediate said bands of open ends and which communicates with open ends of each band during said one arcuate portion of the filter cycle, said chamber and second chamber being arranged arcuately end-to-end, said second chamber communicating through a second flow passage with the interior of said drum whereby the subatmospheric pressure is applied to said open ends through said second chamber during said one arcuate portion, and means are provided for adjustably varying flow through said second flow passage.

13. A rotary drum filter according to claim 12, wherein said wall means for each chamber comprises an arcuate top wall and an arcuate bottom wall, said bottom walls having said flow passages therethrough, and linkage means detachably connects the walls of each chamber with those of the other chamber to join such in a unitary assembly.

14. A rotary drum filter according to claim 13, wherein such unitary assembly is connected to said cutting off means to extend arcuately therefrom.

References Cited

UNITED STATES PATENTS

| | | | |
|---|---|---|---|
| 3,306,460 | 2/1967 | Luthi | 210—404 |
| 3,327,862 | 6/1967 | Carlsmith | 210—392 |

REUBEN FRIEDMAN, Primary Examiner

T. A. GRANGER, Assistant Examiner

U.S. Cl. X.R.

210—404